US 6,554,169 B1

(12) United States Patent  (10) Patent No.: US 6,554,169 B1
Furlong  (45) Date of Patent: Apr. 29, 2003

(54) GOLF BAG LOCKER FOR A PICKUP TRUCK

(76) Inventor: Gary Furlong, 811 Green Passage La., Apex, NC (US) 27502

( * ) Notice: Subject to any disclaimer, the term of this patent is extended or adjusted under 35 U.S.C. 154(b) by 39 days.

(21) Appl. No.: 09/927,789

(22) Filed: Aug. 13, 2001

(51) Int. Cl.$^7$ ................................................ B60R 9/08
(52) U.S. Cl. .................................... 224/404; 296/37.6
(58) Field of Search ......................... 224/404; 296/37.6

(56) References Cited

U.S. PATENT DOCUMENTS 4,967,944 A * 11/1990 Waters ....................... 224/404
5,484,092 A * 1/1996 Cheney ....................... 224/404
5,601,206 A * 2/1997 Haas et al. .................. 220/527
5,848,744 A * 12/1998 Dischner et al. ............ 224/404

* cited by examiner

Primary Examiner—Stephen P. Garbe
(74) Attorney, Agent, or Firm—Mills Law Firm PLLC

(57) ABSTRACT

A golf bag security locker for use in a pickup truck that allows the golfer to securely control access to golfing equipment and paraphernalia when absent from the vehicle. The security locker includes a box-like structure having a main compartment for holding golf bags, and side pods for holding accessory gear. The locker includes a pivoting cover lid having an accessory pocket on the bottom surface for holding personal effects.

4 Claims, 4 Drawing Sheets

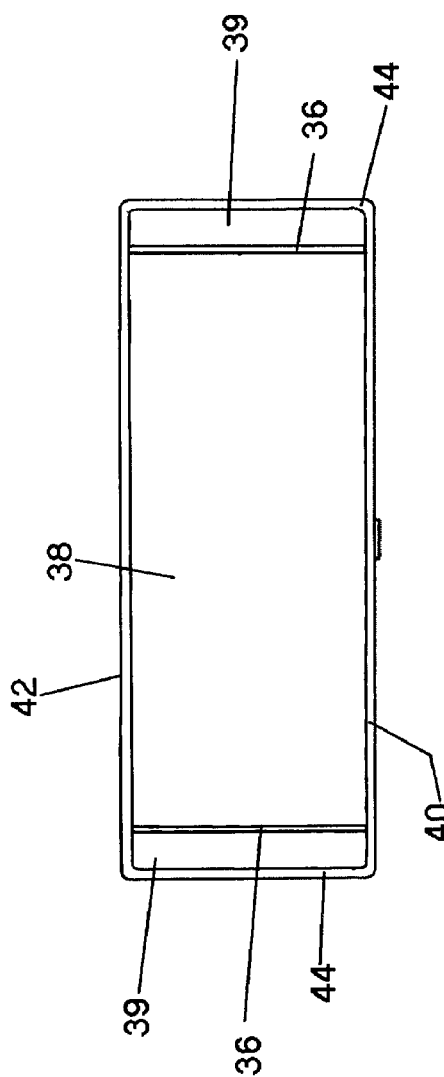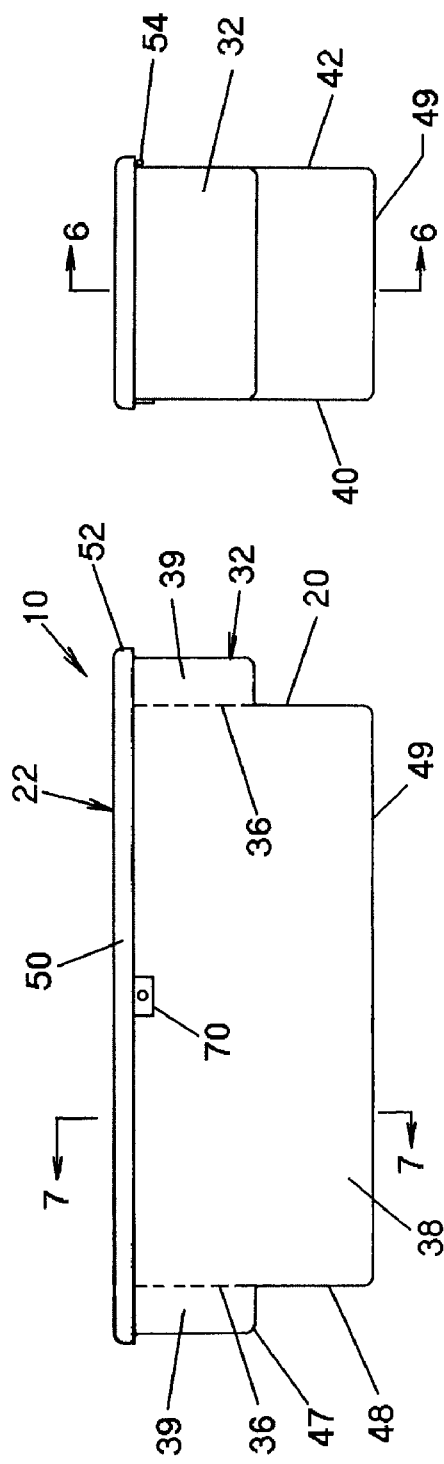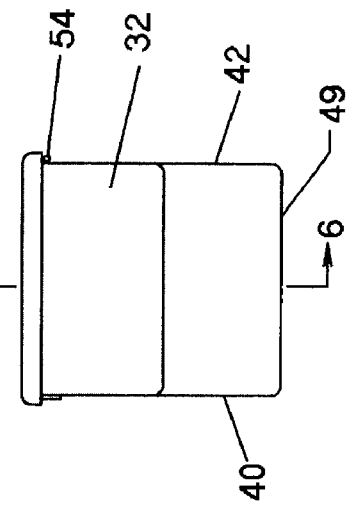

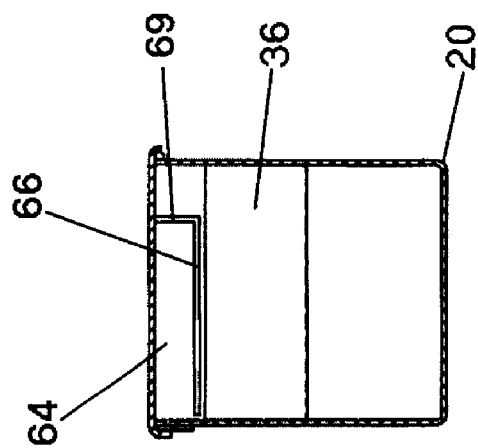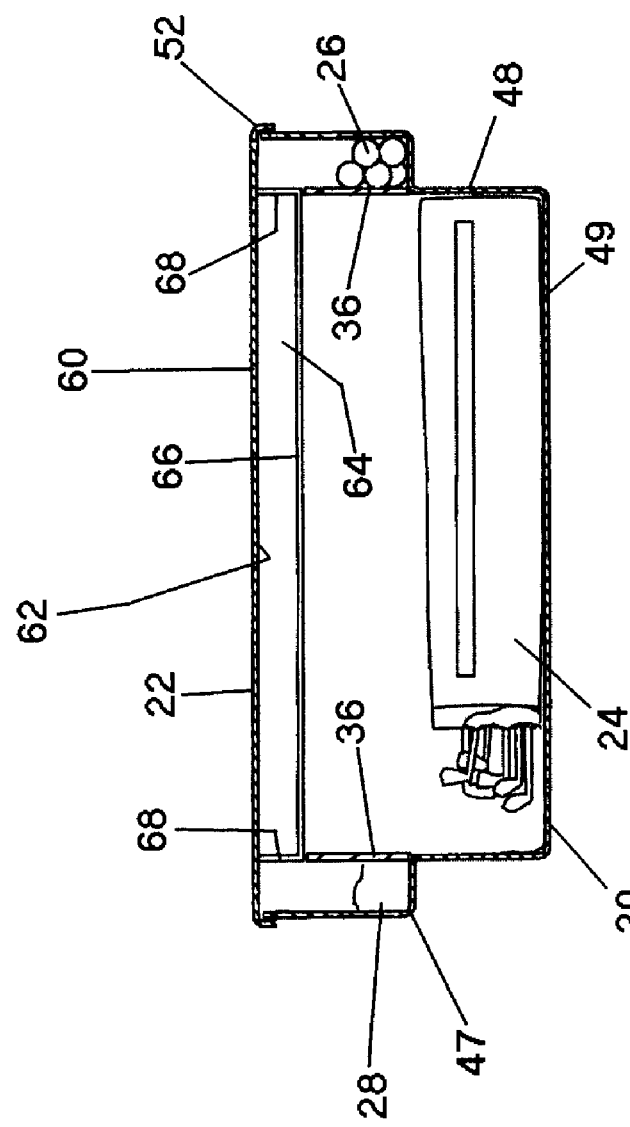

GOLF BAG LOCKER FOR A PICKUP TRUCK

FIELD OF THE INVENTION

This invention relates generally to an apparatus for transporting sporting equipment in a motor vehicle. Specifically, this invention relates to a golf bag security system for transporting a golf bag, golf clubs, golf balls, and similar recreational equipment and sporting goods in the bed of a pickup truck.

BACKGROUND OF THE INVENTION

Golfing is a favorite sport and hobby for millions of people. While played by people from all socioeconomic levels, greens fees, clothing costs, and especially golf club and associated equipment costs have caused golf to be played primarily by the middle and upper economic societal strata. Without regard for income level, any golfer who owns his or her own equipment needs a secure and convenient way to transport and to store the equipment between golf outings. The pickup truck is ubiquitous in the United States and is often the means used to transport the golfer and the equipment to the golf course. Because golf clubs, golf bags, and accessories are large and expensive, it is desirable to have an apparatus that will safely and conveniently store a full-size golf bag with clubs for transportation in the bed of a pickup truck.

Golf clubs and other equipment have been carried in cars, trucks, and every imaginable form of transportation. Focusing on pickup trucks, the mode of transportation relative to the present invention, several devices have been used to attempt to safely and conveniently store and transport golf equipment. None of these devices has accomplished the desired objective as satisfactorily as the present invention. Some of these prior devices are discussed below.

A camper shell can be temporarily or permanently attached to the bed of a pickup truck. Golf clubs and equipment can be placed in the camper shell. Access to a camper shell is usually through a door at the rear of the bed designed for ingress and egress by a person. If the golf bag and clubs are simply placed on the floor of the truck bed or on the floor integral to the camper shell, the clubs are free to move about and likely to be damaged unless some ad hoc means is developed to secure the equipment. Even when such equipment is secured, the camper shell is often an undesirable solution. A camper shell is expensive to purchase. Its weight causes an increase in the fuel costs for the vehicle. Its size negatively impacts the maneuverability of the vehicle and obstructs the driver's vision through the rear window, creating a safety hazard. Its use is seasonal, so it may not be permanently installed on the truck and, therefore, not be available when the golfer needs it. When it is installed, the truck bed is fully covered, and the truck's utility is diminished as the bed is not available for other uses. Camper shells, at least as permanent fixtures on a pickup truck, are often inconvenient, cumbersome, and socially undesirable.

Another device used to enable a pickup truck to securely and safely golf equipment is the bed cover. Bed covers can be made from either rigid or flexible materials. Access to a truck bed is usually made by lifting a hinged lid on a rigid bed cover, while access to a truck bed with a fabric cover is typically made by unfastening a snap or latch to remove part of the cover. Depending on the design of the cover, access is sometimes available by lower the truck's tailgate. The bed cover overcomes some of the limitations and problems presented by a camper shell in that a bed cover is not usually as expensive as a camper shell, it is not as large and does not detrimentally impact the truck's maneuverability, it is not as heavy and does not cause a significant increase in fuel consumption, it does not create a safety hazard by obstructing the driver's rear view, and it is often socially undesirable. However, a bed cover, like a camper shell, severely limits the utility of the truck bed, may not be installed year-round and may not be available when needed to carry golf equipment, and does not secure the equipment from moving around thereby requiring separate restraint within the truck bed. While a more expensive model of a rigid bed cover may have a lock to secure the contents of the truck bed, the fabric bed cover suffers from the additional limitation that it can be penetrated by a sharp instrument as common as a screwdriver or a pocket knife. While a fabric-type bed cover may shield expensive golf bags, clubs, and other equipment from the weather, it will provide little or no protection against theft.

DESCRIPTION OF THE PRIOR ART

A patentability search revealed the following patents, none of which suggests or teaches the specific apparatus and/or method of the present invention: U.S. Pat. No. 4,718,583 to Mullican; U.S. Pat. No. 4,848,626 to Waters; U.S. Pat. No. 4,946,215 to Taylor; U.S. Pat. No. 5,207,469 to Rossi; U.S. Pat. No. 5,297,707 to Weber; U.S. Pat. No. 5,299,722 to Cheney; U.S. Pat. No. 5,556,064 to Cowe; U.S. Pat. No. 5,601,206 to Haas et al.; U.S. Pat. No. 5,964,492 to Lyon; and U.S. Pat. No. 5,967,392 to Niemi et al.

BRIEF DESCRIPTION OF THE INVENTION

After much research and study into the above-mentioned problems, the present invention has been developed to provide a golf bag security locker for use in a pickup truck that allows the golfer to securely control access to golfing equipment and paraphernalia when absent from the vehicle. The security locker includes a box-like structure having a main compartment for holding golf bags, and side compartment pods for holding accessory gear. The locker includes a pivoting cover lid having an accessory pocket on the bottom surface for holding personal effects.

In view of the above description, it is an object of the present invention to provide a secure means for transporting golf clubs, golf bags, golf balls, shoes, and similar recreational equipment and sporting goods in the bed of a pickup truck. Specifically, the golf equipment must be secure such that it is not damaged while being transported, is protected against theft, and is protected from road elements and weather.

Another object of the present invention is to provide a golf bag security system that is economical in that it is not so heavy as to cause a significant increase in fuel consumption.

Another object of the present invention is that the size of the golf bag security system must be compact enough that it does not adversely or unsafely affect the maneuverability of the truck or block the driver's rear view.

Additional objects of the present invention are that the golf bag security system be available on a year-round basis, that it is socially acceptable to the typical golfer, and that the truck bed leave space available for additional uses.

Other objects and advantages of the present invention will become apparent and obvious from a study of the following description and the accompanying drawings, which are merely illustrative. Additional aspects, features and embodiments of the invention will be more fully apparent from the ensuing disclosure and appended claims.

BRIEF DESCRIPTION OF THE DRAWINGS

The above and other objects and advantages of the present invention will become apparent upon reading the following detailed description taken in conjunction with the accompanying drawings in which:

FIG. 3 is a front elevational view of the security locker;

FIG. 4 is an end view of the security locker;

FIG. 5 is a top view of the security locker with the lid removed;

FIG. 6 is a cross sectional view taken along line 6—6 in FIG. 4; and

FIG. 7 is a cross sectional view taken along line 7—7 in FIG. 3.

DETAILED DESCRIPTION OF THE PREFERRED EMBODIMENT

Figure 1:
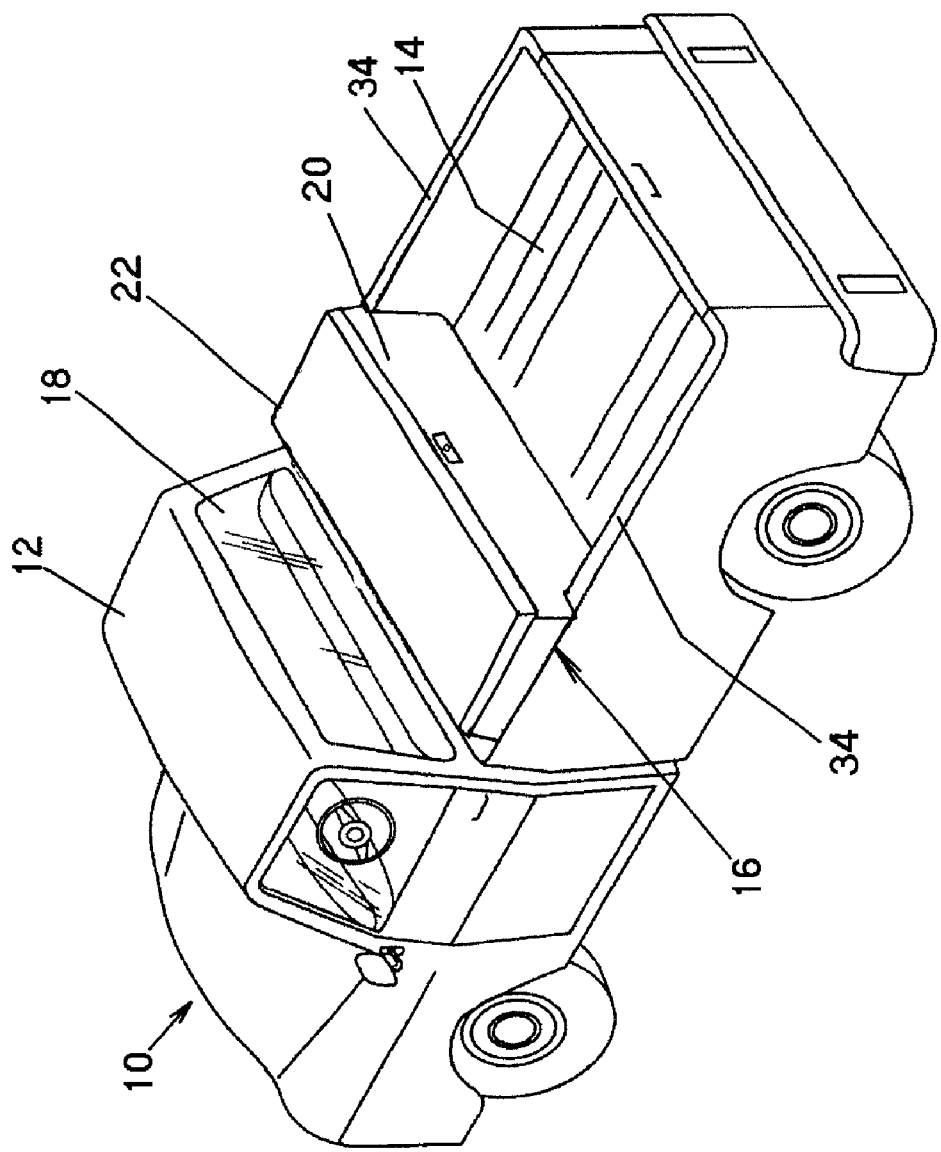
FIG. 1 is a perspective view of a golf security locker carried in the bed of a pickup truck.

With further reference to the drawings wherein similar parts similar parts of the invention are identified by like reference numbers, FIG. 1 illustrates a pickup truck 10 including a cab 12 and an open rectangular bed 14 carrying a golf gear security locker 16 at the forward end thereof adjacent the cab 12 and disposed so as to not affect the rearward vision of the drive through the rear window 18.

The security locker 16, shown in more detail in FIGS. 2 through 7, comprises a container 20 and a lid 22. The security system 16 transports therewithin golf gear and related items, such as a golf club bag 24, golf balls 26 and personal items.

The container 20 includes a rectangular base container 30 having a width substantially the same as the width of the bed 14 and a pair of lateral pods 32 overlying and resting on top of the sidewalls 34 of the bed 14. The peripheral walls of the base 30 and the side pockets 32 form an upwardly opening, generally rectangular compartment upwardly terminating with a peripheral edge defining an open top. The upper portion of the base container 30 and the side pods 32 are separated by transverse divider walls 36 thereby establishing a center compartment 38 and laterally spaced side compartments 39 located above the sidewalls 34 of the bed of the truck.

The container 20 is formed in a conventional manner typical for boxes carried in pickup trucks, such a sheet metal, plastic moldings, laminates or the like. The container 20 includes generally T-shaped, laterally spaced front and rear walls 40, 42 respectively. The container 20 includes sidewalls 44 having an upper L-shaped wall section 47 defining the pods 32 and a lower vertical wall section 48 terminating at a lower rectangular container base 49.

The lid 22 has a generally rectangular top 50 circumscribed by a downwardly turned rim 52 peripherally surrounding the upper end of the container 20. The lid 22 is pivotally connected to the container 20 at the walls adjacent the cab 14 by a piano hinge 54 for movement from a closed position to an open position providing access to the compartments 38, 39. A pair of counterweighting air cylinder struts 46 assist in maintaining the lid 22 in the opening positions.

The top 50 has a rectangular top surface 60 and opposed bottom surface 62. An accessory pocket 64 is attached to the bottom surface 62. The accessory pocket 60 includes walls defining a rearwardly opening receptacle for the golfer's accessories such as wallets, keys, and like pocket items. The front edge of the pocket 64 lies closely adjacent the rear wall 62 of the container to securely retain items therein when the lid is the closed position. The accessory pocket 64 is defined as shown in FIGS. 6 and 7 by a rectangular base wall 66 spaced downwardly from the lower surface of the lid 22, a pair of laterally spaced rectangular sidewalls 68 aligned with the divider walls 36, and a vertical end wall 69. The divider walls 36 terminate below the top surface of the container 20, and engage or slightly spaced from the sidewalls 68, thereby providing a continuous barrier surface to prevent the contents in the side compartments 39 from entering the main compartment 38 during vehicle travel. In the open position, the shorter divider walls provide easier access to the contents in the side compartments.

Figure 2:
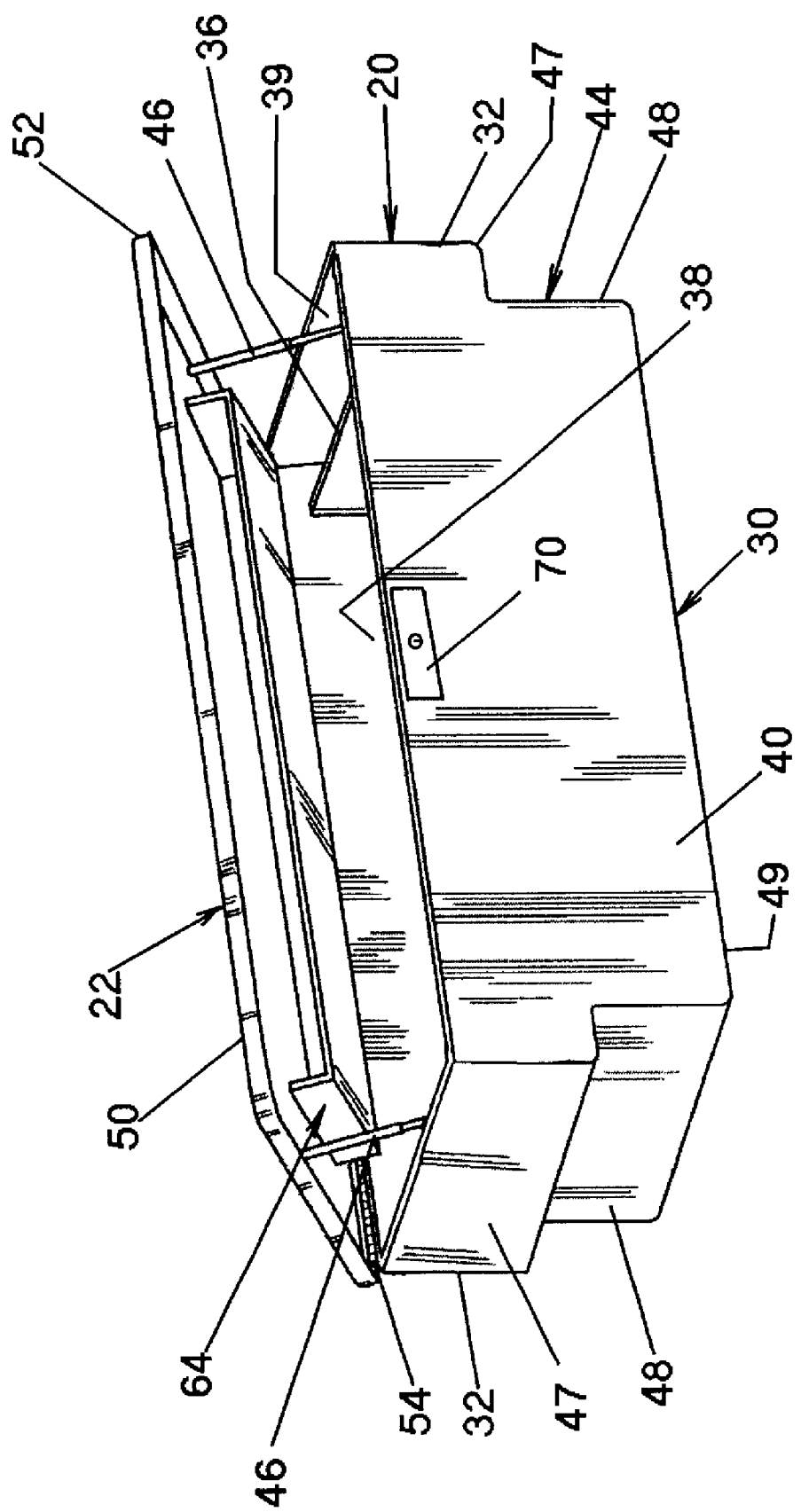
FIG. 2 is a perspective view showing the locker with the lid raised.

Referring to FIGS. 2 and 6, the main storage compartment 38 is essentially in the shape of a rectangular box optimized to be large enough to hold golf bags with golf clubs and similar sporting goods equipment while being small enough to permit the security locker 16 to fit into the bed 14 of the pickup truck 10.

The lid 22 is locked in the closed position by a suitable latch 70, which is preferably metal and has a keyed lock to prevent unauthorized access to the inside compartments.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A security locker for storing golf gear in the bed of a pickup truck having a pair of spaced sidewalls extending from the cab of the truck, said security locker comprising: an upwardly opening base container having an interior with an open top, said container having laterally spaced T-shaped vertical front and rear walls, a horizontal base extending between said sidewalls of said bed, and a pair of longitudinally spaced end walls, each including an L-shaped upper portion and a vertical lower portion, said upper portion connecting the upper ends of said front and rear walls and overlying said sidewalls of said bed, said lower portions connected with the lower ends of said front and rear walls and spaced inwardly of said sidewalls of said bed; a horizontal lid covering said top and establishing a interior container space, divider walls extending across said container space and aligned with said lower portions of said end walls, said divider walls dividing said container space into a main compartment for storing a golf bag and side compartments for storing golf gear, said dividing walls terminating below said top of said container; and a storage pocket carried on a lower surface of said lid within said container space said storage pocket including sidewalls adjacent to and aligned with said divider walls when said lid is in a closed position thereby separating said main compartment from said side compartments and, having an access opening adjacent said front wall and enclosed thereby in a closed position.

2. The security locker as recited in claim 1 including means between said lid and said container for maintaining said lid in an open position.

3. The security locker as recited in claim 2 including lock means for maintaining said lid in said closed position.

4. The security locker as recited in claim 3 wherein said main compartment has sufficient space for accepting a plurality of golf bags.

\* \* \* \* \*